(12) United States Patent
Kerr et al.

(10) Patent No.: US 10,149,116 B1
(45) Date of Patent: Dec. 4, 2018

(54) EARLY NOTIFICATION OF DRIVING STATUS TO A MOBILE DEVICE

(71) Applicant: Allstate Insurance Company, Northbrook, IL (US)

(72) Inventors: Neil Kerr, Waringstown (IE); William McCullough, Ballygowan (IE); Suzi Murtagh, Belfast (IE)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 15/417,512

(22) Filed: Jan. 27, 2017

(51) Int. Cl.
*H04W 24/00* (2009.01)
*H04W 4/04* (2009.01)
*H04M 1/2745* (2006.01)
*H04W 4/12* (2009.01)

(52) U.S. Cl.
CPC ......... *H04W 4/046* (2013.01); *H04M 1/2745* (2013.01); *H04W 4/12* (2013.01)

(58) Field of Classification Search
CPC ......... H04W 4/02; H04W 64/00; H04W 4/14; H04W 4/12; H04L 29/08657; H04M 3/42042; H04M 1/57; H04M 19/04; H04M 1/72519; H04M 1/6091
USPC .................................. 455/567–569.2, 575.9
See application file for complete search history.

(56) References Cited

U.S. PATENT DOCUMENTS

| | | |
|---|---|---|
| 7,085,253 B2 | 8/2006 | Yang |
| 7,864,935 B2 | 1/2011 | Elliott |
| 8,050,690 B2 | 11/2011 | Neeraj |
| 8,270,933 B2 | 9/2012 | Riemer et al. |
| 8,271,057 B2 | 9/2012 | Levine et al. |
| 8,279,071 B2 | 10/2012 | Cavanaugh |
| 8,457,880 B1 | 6/2013 | Malalur et al. |
| 8,489,111 B2 | 7/2013 | Chawla |
| 8,489,271 B2 | 7/2013 | Hergesheimer et al. |
| 8,538,402 B2 | 9/2013 | Vidal et al. |
| 8,583,079 B2 | 11/2013 | Chawla |
| 8,738,214 B2 | 5/2014 | Olsen et al. |
| 8,930,229 B2 | 1/2015 | Bowne et al. |
| 8,958,830 B2 | 2/2015 | Chawla |
| 8,965,464 B2 | 2/2015 | Chawla |
| 8,971,860 B1 | 3/2015 | Olincy et al. |
| 9,002,538 B2 | 4/2015 | Hergesheimer et al. |
| 9,191,797 B2 | 11/2015 | Alam |
| 9,208,525 B2 | 12/2015 | Hayward et al. |
| 9,217,757 B2 | 12/2015 | Hergesheimer et al. |
| 9,374,693 B1 | 6/2016 | Olincy et al. |

(Continued)

FOREIGN PATENT DOCUMENTS

WO 2011161674 A1 12/2011

OTHER PUBLICATIONS

"Stay connected to the people that matter" Product Tour Life360—The New Family Circle downloaded from https://www.life360.com/tour/ on Dec. 2, 2016.

(Continued)

*Primary Examiner* — Dai A Phuong
(74) *Attorney, Agent, or Firm* — Banner & Witcoff, Ltd.

(57) ABSTRACT

Applications, systems, and methods, configured to automatically detect whether a vehicle containing a mobile device of a driver is being driven and automatically notify selected friends and family of the driving status of the vehicle so that the friends and family may opt not to send a message or other distraction to the driver.

20 Claims, 8 Drawing Sheets

(56) References Cited

U.S. PATENT DOCUMENTS

| | | | |
|---|---|---|---|
| 9,390,625 B2 | 7/2016 | Green et al. | |
| 9,398,423 B2 | 7/2016 | Cordova et al. | |
| 9,406,222 B2 | 8/2016 | Hergesheimer et al. | |
| 9,418,383 B1 | 8/2016 | Hayward et al. | |
| 9,432,499 B2 | 8/2016 | Hajdu et al. | |
| 9,450,897 B2 | 9/2016 | Chawla | |
| 9,477,639 B2 | 10/2016 | Fischer et al. | |
| 9,491,589 B2 | 11/2016 | Schrader et al. | |
| 2009/0300525 A1 | 12/2009 | Jolliff et al. | |
| 2013/0232552 A1 | 9/2013 | Brush et al. | |
| 2013/0303190 A1* | 11/2013 | Khan | H04W 64/00 455/456.2 |
| 2013/0339453 A1 | 12/2013 | Aggarwal et al. | |
| 2015/0341290 A1 | 11/2015 | Cherifi et al. | |
| 2015/0350860 A1* | 12/2015 | Wimmer | H04W 4/22 455/404.2 |
| 2015/0373504 A1 | 12/2015 | Grinalds et al. | |
| 2016/0050315 A1* | 2/2016 | Malhotra | H04M 3/436 455/414.1 |
| 2016/0129882 A1* | 5/2016 | Thompson | G07C 5/008 701/2 |
| 2016/0226834 A1* | 8/2016 | Dawson | H04L 63/0428 |
| 2016/0314318 A1 | 10/2016 | Li et al. | |
| 2016/0364482 A9* | 12/2016 | Midtun | G06Q 10/10 |
| 2017/0195863 A1* | 7/2017 | Demele | H04W 4/206 |
| 2017/0206593 A1* | 7/2017 | Zolotov | G06Q 30/0639 |
| 2018/0070290 A1* | 3/2018 | Breaux | H04W 76/14 |
| 2018/0098197 A1* | 4/2018 | Yoo | H04W 8/22 |
| 2018/0152563 A1* | 5/2018 | Mehta | H04W 4/90 |

OTHER PUBLICATIONS

"Stay focused while driving with AT&T Drive Mode" dowloaded from http://www.att.com/gen/press-room?pid=23185 on Dec. 5, 2016.

"Technology to prevent distracted driving" dowloaded from https://cellcontrol.com/stop-texting-while-driving-for-your-family?_hstc=235055454.62b6c79b1d0c2afdae8fe8363c606d56.1480488549633.148048854963 . . . on Dec. 2, 2016.

"Let Friends & Family Know Where You Are Automatically with a Secret Text Code" downloaded from www.android.wonderhowto.com/let-friends-family-know-where-you-are-automatically-with-secret-text-code-0172444/ on Dec. 2, 2016.

"Waldo—stay in the loop with family & friends with automatic status updates" by whenst dowloaded from https://itunes.apple.com/us/app/waldo-stay-in-loop-family/id930619206?mt=8 on Dec. 2, 2016.

"Stay connected with people you care about" from Status—The app for automatic status updates downloaded from http://trystatus.com/ on Dec. 2, 2016.

* cited by examiner

EARLY NOTIFICATION OF DRIVING STATUS TO A MOBILE DEVICE

TECHNICAL FIELD

Aspects of the disclosure generally relate to transforming data records in a native address book on a mobile phone to transform third-party applications on the mobile phone, without causing modification to the code of the third-party application, to generate notifications in a mobile device as to whether a potential recipient of a message is driving a vehicle.

BACKGROUND

Drivers may have mobile devices, such as mobile phones, while driving in their vehicles. Texting while driving is distracting and can be dangerous. Sometimes just receiving a text message while driving can be distracting even if the driver does not actually read the message. Accordingly, there is a need to advise potential senders of text messages if the recipient is driving so that the sender is advised not to send a message at that time.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to applications, systems, and methods, configured to automatically detect whether a vehicle is being driven and automatically notify selected friends and family of the driving status of the vehicle so that the friends and family may opt not to send a text message to the driver.

Aspects of the invention further relate to the use of a server to receive a notification from a mobile device indicating that the user of the device is driving and to propagate the notification to mobile devices of pre-selected family and friends.

Aspects of the invention further relate to notifying a mobile device of a selected family or friend and waking an application in the mobile device to modify the native address book in the device to indicate that a contact in the address book is driving.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

Applications, systems, and methods described herein are configured to automatically detect whether a vehicle is being driven and automatically notify selected friends and/family of the driving status of the vehicle so that the friends and family may opt not to send a text message (or any other type of distraction, such as an e-mail, instant message, phone call, or other notification) to the driver. In order for friends and family to know if a driver is driving, the driver must allow location services (e.g. GPS), motion services (e.g. accelerometer, compass, gyroscope), and/or notifications on the driver's mobile device. Meanwhile, the friends and family must allow notifications on their mobile devices to be able to receive update notifications. The driver's mobile device automatically detects if the mobile device is in a driven vehicle and automatically propagates status notification to friends and family via a server. The driver's mobile device will further automatically propagate a notification of change in status (i.e. stopped driving.)

In one aspect, when a driver starts driving, a notification is automatically sent from the driver's mobile device, via a server, to their friend and/or family's mobile device. The notification automatically updates the native contacts book on a friend or family's mobile device, for example, by inserting a Unicode associated with a particular icon/emoticon/emoji (hereinafter "icon") in the contact information for the driver. When the friend or family member opens a third party application, for example a messaging application, the icon corresponding to the Unicode appears besides the driver's (potential recipient's) name in the list of contacts display on the mobile device. The icon informs the friend or family that the potential recipient is driving. Notably, the third party application may be an application unrelated to providing user status notifications, however, as a result of the technologically innovative features disclosed herein, the third party application may be transformed into an application that provides driving status updates. Significantly, in many embodiments, the code of the third party application is not modified to implement the aforementioned transformation because the transformation occurs seamlessly and completely through the native contacts book on the mobile device.

When the driver stops driving, an updated notification is automatically sent from the driver's mobile device, via the server, to the friend or family's mobile device where the notification again updates the native contacts book on friend or family's mobile device, removing the icon from beside the driver's (potential recipient's) name.

In other words, a status update is obtained by using the sensors (accelerometer, GPS, gyroscope, compass etc.) in a driver's mobile device to detect driving and the status is then propagated, via a server, to native contact books on all selected friends and family mobile devices. The present system simply serves as a passive notification to a user that a potential recipient of a message is driving. Messages are not actively blocked or restricted in any way.

In other embodiments, a hybrid passive-active blocking approach is contemplated. The disclosure contemplates a system and/or method in which messages may be blocked at the source of the message (e.g., at the sender's side) before the sender spends time and computing resources to author and attempt to send the message. While systems exist that send an auto-reply to a sender in response to their message having been attempted for delivery or having been delivered, such systems would be improved, in some embodiments, by preemptively blocking the message. In such an embodiment, third-party applications and/or the smartphone's operating system may be modified to detect the presence of a particular flag (e.g., a Unicode character) in the contact's name and subsequently block, at the originating device, the message/notification before it is even typed/generated. For example, the block may be implemented as a graying out of a text field so that a user cannot type text in the message field and/or press a "submit message" button. As such, the sender is saved from typing a message that might subsequently be blocked in some form anyway.

In certain aspects, an application "app" continuously runs in the background of the mobile device so as to automatically detect when the driver starts driving and stops driving. The app also automatically sends notifications of the driving status to other mobile devices. In a further aspect, the app receives notifications from other mobile devices that the users of those other mobile devices are currently driving (e.g., in transit). In other aspects, on certain mobile devices, apps not in use are suspended or asleep until there is a trigger, for example, the start/stop of driving or use of voice over IP (VoIP) to send a notification which wakes the app. At least one benefit of using notifications (e.g., VoIP notifications) to awaken the app is that less battery power and computing resources are consumed while the app is asleep in the background. In addition, the use of VoIP notification may be substituted with non-VoIP notifications in those platforms (e.g., Android™ operating systems) where background applications are permitted to be awoken by such notifications.

The present system creates a more technologically efficient and improved solution to inject unintended functionality into third-party software applications such that the third-party application subsequently provide a potential sender of a message/communication/distraction with advance notification that the potential recipient is driving. The present system consumes less network bandwidth and less memory than other notification means. For example, existing solutions rely upon the recipients' phone (i.e., the driver's phone) to send an auto-reply message back to a server that then communicates the message to the sender's phone to indicate that a response to their message may be delayed because the recipient is driving. Such systems consume unnecessary bandwidth with auto-reply messages and also sometimes result in an audible/visual/haptic notification at the driver's phone, thus undermining the reduction of distracting driving. Moreover, the present system consumes less memory on a mobile phone because an auto-reply message need not be created, transmitted, received, and stored. In some instances the sender may also archive a copy of the auto-reply message too. Finally, in addition to providing a more technologically efficient/improved system, the disclosed system also prevents/discourages distracted driving in a novel and non-obvious way.

As will be appreciated by one of skill in the art upon reading the following disclosure, various aspects described herein may be embodied as an application, a system, or a method, including software and/or hardware aspects.

Figure 1:
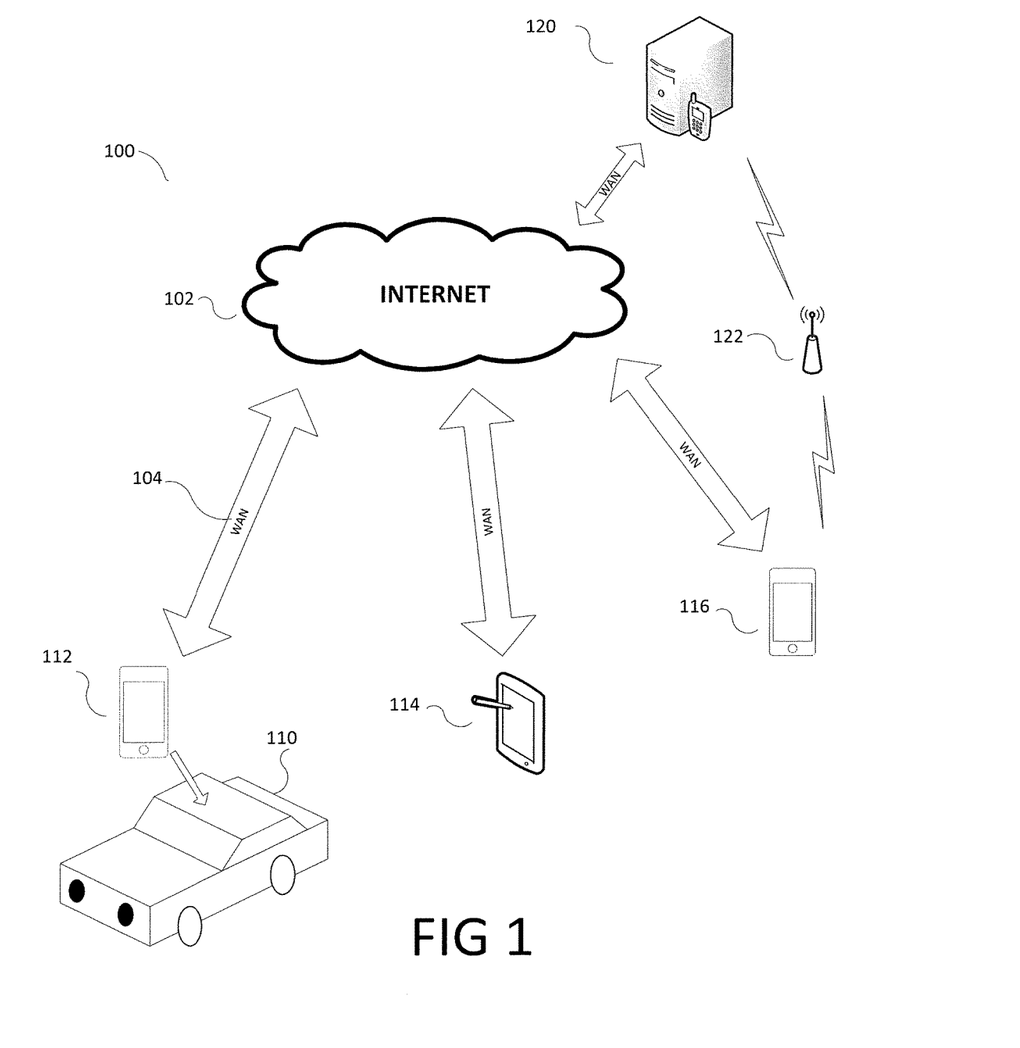
FIG. 1 illustrates a network environment that may be used to implement aspects of the disclosure.

FIG. 1 illustrates a block diagram of a WAN networking environment 100, including a network 102 (e.g., the Internet) or other means for establishing communications over the WAN network 104. The network 102 may be any type of network and may use one or more communication protocols (e.g., protocols for the Internet (IP), Bluetooth, cellular communications, satellite communications, and the like) to connect computing devices and servers within the networking environment 100 so they may send and receive communications between each other. In particular, the network 102 may include a cellular network and its components, such as cell towers. Accordingly, for example, a mobile device 112 (e.g., a smartphone) of a driver associated with vehicle 110 may communicate, via a cellular backhaul of the network 102, with another mobile device, e.g. tablet 114, smartphone 116.

The mobile devices 112, 114, 116 may communicate back and forth over the Internet, such as through a server 120. When used in a WAN networking environment 100, the server 120 may include one or more transceivers, digital signal processors, and additional circuitry and software for communicating with wireless mobile devices (e.g., smart phone 116) via one or more network devices 122 (e.g., base transceiver stations) in the wireless network.

Mobile devices 112, 114, 116 may be, for example, mobile phones, personal digital assistants (PDAs), tablet computers, smartwatches, and other devices that may be carried by drivers inside or outside of the vehicle 110.

Vehicle 110 may be, for example, an automobile, truck, motorcycle, scooter, bus, recreational vehicle, boat, or other vehicle for which sensor data may be collected and analyzed by the mobile device.

The server 120 receives the driving status notification and then transmits the driving status notification to other mobile devices 114, 116, configured to accept such notifications. That is, the server 120 may accept a single notification of driving status and automatically transmit the driving status notification to each one of multiple mobile devices 114, 116. For example, if a driver of vehicle 110 having mobile device 112 has 15 friends selected to receive the driving status notifications, then the server 120 will receive one incoming driving status notification, but transmit 15 outgoing driving status notifications.

The server 120 may maintain user access/security features to regulate what mobile devices the server transmits the driving status notifications to. For example, the driver of vehicle 110 having mobile device 112 can select (or preselect) from a contact list or address book contacts who will receive the driving status notifications. When these selections occur, they are transmitted to the server and stored there to be referenced later whenever notifications are to be distributed.

Figure 2:
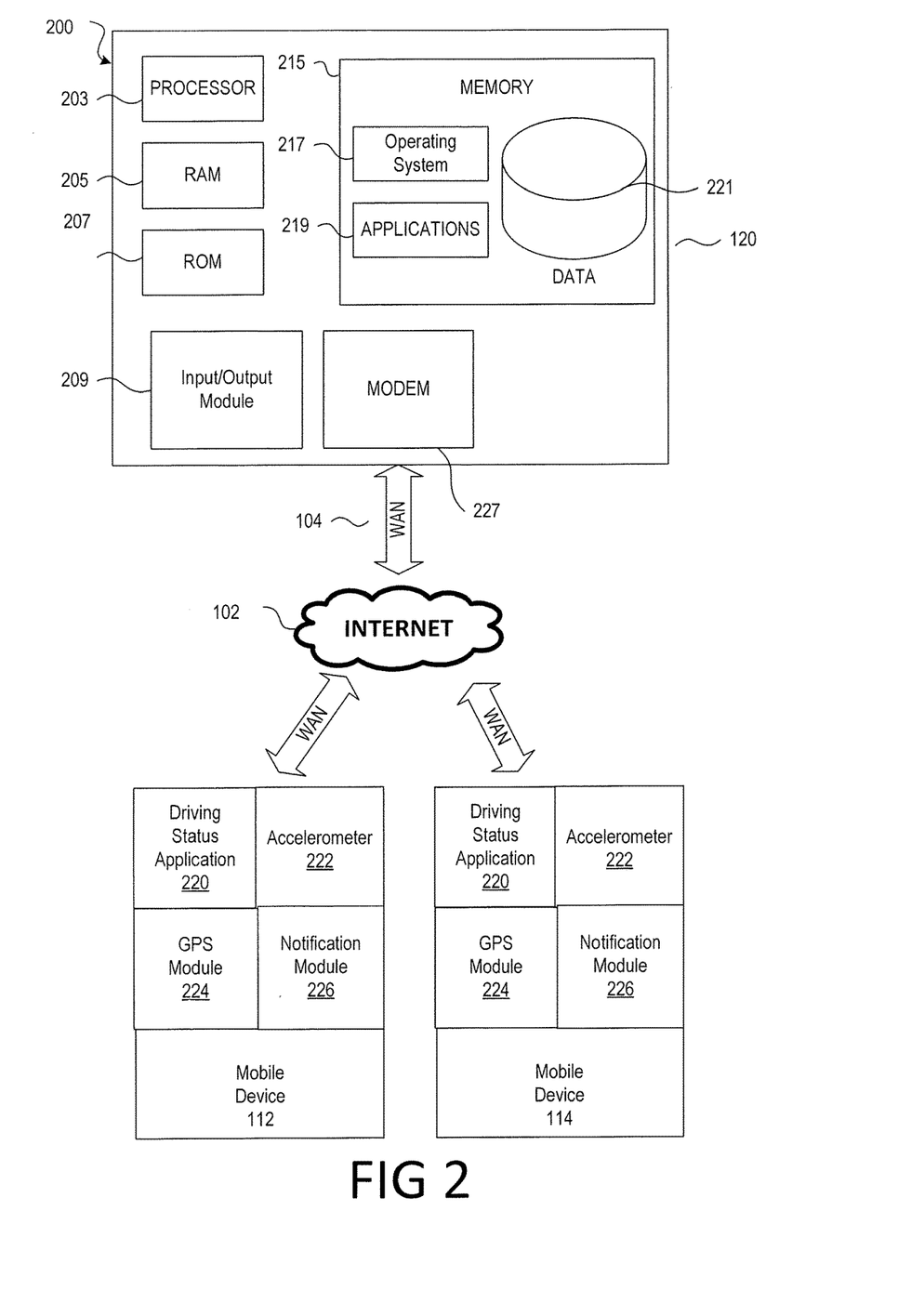
FIG. 2 illustrates the network environment with computing systems that may be used to implement aspects of the disclosure.

FIG. 2 illustrates a block diagram of a computing system 200 useful with communication system 100. The server 120 may have a processor 203 for controlling overall operation of the server 120 and its associated components, including RAM 205, ROM 207, input/output module 209, and memory 215. The server 120, along with one or more additional devices (e.g., mobile devices 112, 114) may correspond to any of multiple systems or devices, such as a driving status system, configured as described herein for receiving notifications, analyzing, and transmitting notifications from various mobile devices.

Input/Output (I/O) 209 may include a microphone, keypad, touch screen, and/or stylus through which a user of the server 120 may provide input, and may also include one or more of a speaker for providing audio output and a video display device for providing textual, audiovisual and/or graphical output. Software may be stored within memory 215 and/or storage to provide instructions to processor 203 for enabling server 120 to perform various functions. For example, memory 215 may store software used by the server 120, such as an operating system 217, application programs 219, and an associated internal database 221. Processor 203 and its associated components may allow the driving status computing 200 to execute a series of computer-readable instructions to receive notifications from a mobile device.

The mobile devices 112, 114 may each comprise a processor configured to receive sensor data from motion sensors, e.g. an accelerometer 222, location sensors, e.g. GPS 224, and other sensors. Sensor data can include, for example, location data, acceleration data, time data, direction data, mobile device orientation data, rotation/gyroscopic data, and the like.

For example, the accelerometer 222 of the mobile device may be a triaxial accelerometer to measure acceleration along three different axes. The acceleration data generated by the accelerometer of the mobile computing device may likewise be indicative of right/left acceleration, forward/backward acceleration, and up/down acceleration. The GPS module of the mobile device may receive geographic location information (e.g., latitude/longitude coordinates) from a Global Positioning System corresponding to a geographic location of the mobile device.

The processor of the mobile device may process the received sensor data to determine whether the vehicle is being driven. Software applications executing on the mobile device 112, 114 may be configured to receive sensor data from the accelerometer (e.g., acceleration data), gyroscope (e.g., rotation data, such as speed of rotation data), and other sensors. The data collected by the mobile device 112 may be stored and/or analyzed within the mobile device 112. The processing components of the mobile device 112 may be used to analyze sensor data to determine whether or not the vehicle 110 is being driven.

If a vehicle is being driven, a driving status application 220 on a mobile device 112 in the vehicle is configured to transmit a driving status notification to a server 120. For example, a notification module 226 of the mobile device may enable the mobile computing device to communicate via a networking environment such as a cellular network, the Internet, and/or the like. The notification module 226 of the mobile phone will allow notifications to be sent and received via the telecommunications module.

It will be appreciated that the network connections shown are illustrative and other means of establishing a communications link between the server and mobile devices may be used. The existence of any of various network protocols such as TCP/IP, Ethernet, FTP, HTTP and the like, and of various wireless communication technologies such as GSM, CDMA, WiFi, and WiMAX, is presumed, and the various devices and driving status components described herein may be configured to communicate using any of these network protocols or technologies.

Additionally, one or more application programs 219 used by the server 120/or application programs of mobile devices/ system 200 may include computer executable instructions for receiving driving status data, notification data, contact information data for one or more drivers, and performing other related functions as described herein.

Figure 3:
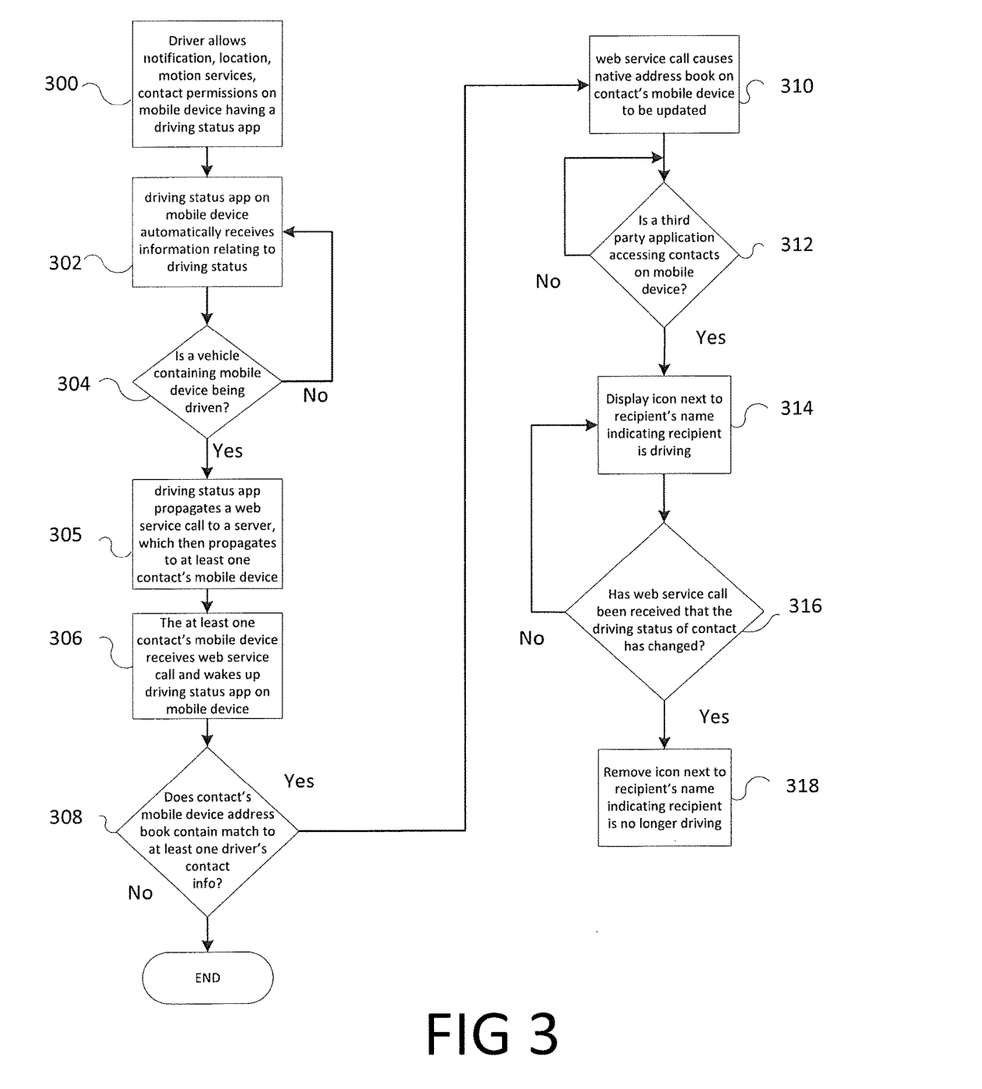
FIG. 3 is a flow diagram illustrating an exemplary method of notifying a potential sender of a text message if the recipient is driving.

FIG. 3 is a flow diagram illustrating an example method of a mobile device application (driving status app) automatically detecting when a person is driving and then notifying the driver's friends and family to not distract the driver. The notification may be made by displaying, in each of the friends' and families' mobile devices, a special icon besides the driver's name or an outline/circle around the driver's name.

Prior to implementing the method shown in FIG. 3, the driving status application must be installed on mobile devices of friends and family that will be participating in sending/receiving notifications of driving status. Ideally, all the friends and family participating will allow all of motion services, location services, and notification services on their mobile device. Although, if certain friends and family members do not drive, it may not be necessary to allow the motion and location services. Instead, these members would simply receive notifications of other friends and family that are driving. Likewise, in some embodiments, vehicles may be equipped with wireless/wired communication protocols that permit them to broadcast the start and stop of a trip. In such instances, the vehicle may communicate directly with a paired mobile phone (e.g., wirelessly paired, or paired over a cable connection) to provide driving status updates. In such instances, the mobile phone need not necessarily allow/ activate motion services.

The mobile device may be any mobile device that is capable of communicating with another mobile device. The mobile device may be any suitable device such as, but not limited to, a mobile phone, a smartphone, a tablet, or a watch. The mobile device should have a native address book or contact list database. That is the mobile device has a native application (apps) program for an address book or contact list database that has been developed for use on that device. Because native apps are written for a particular device and operating system and have a specific platform, the apps can interact with and take advantage of operating system features and other software that is typically installed on that platform. Native apps such as address books or contact list databases can take advantage of the latest technology available on mobile devices.

Aspects of the present disclosure transform data records in the native address book or contact list on the mobile device to transform the third-party applications (e.g. message applications), without causing modification to the code of the third-party application, to generate notifications in a mobile device as to whether a potential recipient of a message is driving a vehicle.

A particular aspect relates to searching the native address book or contact list when a notification (e.g., update notification) regarding driving status of another is received. The notification may be received for another mobile device having a unique identifier, generally the phone number, however, a unique machine identifier (e.g., a MAC address of sorts) may be used in some embodiments. The recipient's mobile device may subsequently search the native address book or contact list for the unique identifier. If a match is not found, the recipient's device may have the option of sending a bounce back message or may advise the recipient that a notification has been received that is not associated with a known contact and provide an option to allow the recipient to save the contact information and accept the contact's driving status notification. Alternatively, the update notification may simply be discarded. In another embodiment, the remote server may also filter these update notifications and send them only to those recipient devices previously known to contain the unique identifier in their native address book.

Figure 5:
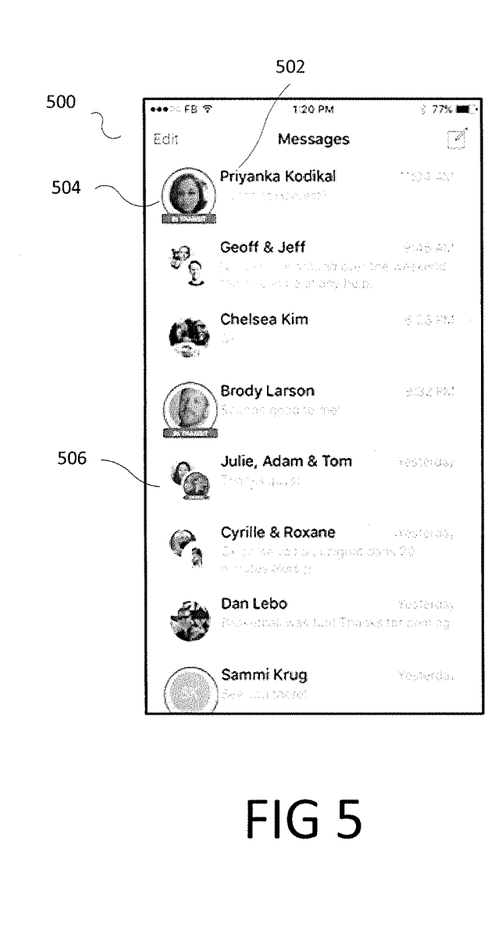
FIG. 5 is another exemplary screen shot of a contact list indicating whether a contact is driving.

When a match is found, the driving status app may insert a pre-defined Unicode in the native address book or contact list code in a data record associated with the unique identifier. The Unicode would be associated with an icon that identifies that the person associated with the mobile device is driving. When a third party application is opened, the icon associated with the Unicode is displayed adjacent the contact's name. In other embodiments, the data record of the contact (i.e., the driver) may be modified to update a border or other visually identifiable marker on or around the photograph stored in the data record, such as shown in FIG. 5.

In one particular aspect shown in FIG. 3, a driver of a vehicle has a mobile device, which is capable of automatically detecting when a vehicle is being driven. In step 300, the driver allows the driving status appaccess to location (e.g. GPS) and/or motion services (e.g. accelerometer, gyroscope, compass, etc.) on the mobile device so that the start/stop of a driving trip is automatically detected by the mobile device. The driver also pre-selects contacts from the address book or contact list in the mobile device to receive information of the driving status of the driver. The driver also grants permission to transmit the information to these contacts. These contacts may be transmitted to a server (step not shown.)

In step 302, the driving status app will automatically send information to the server such as the server 120 in FIG. 1. In another example, in step 302, the information is sent to a driving engine API (application programmers interface) present (e.g., installed) on the mobile device and capable of determining if the mobile device is in a vehicle being driven. In step 304, the server and/or the engine API determines if the vehicle containing the mobile device is being driven. If it is determined that the vehicle containing the mobile device is not being driven, then the driving status app will continue to monitor the mobile device (step 302).

If it is determined that the vehicle containing the mobile device of the driver is being driven, then the driving status app may submit a web service call to a server, which will convey a status notification to selected recipients. The server may maintain user access/security features to regulate who receives updated driving notifications. In this example, the status notification is achieved by a web service call; however, any suitable means for conveying the status or notification may be utilized. Moreover, in step 305, the server propagates a web service call of the driver's status to at least one selected contact's mobile device that also contains the driving status app. For example, the at least one contact may be part of a friend's and family's contact list that has previously downloaded the driving status app.

The web service call generally transmits through the internet and a server as described for FIG. 1 as would be typical for text messages, other notifications, phone services, and the like.

In step 306, the contact's mobile device receives the web service call of the driver's driving status. For contact mobile devices that operate with an Android operating system, a regular web service call is sufficient as the driving status app is running in the background in an active mode.

In some mobile devices, in particular Apple™ iPhones, apps that are not being used may be suspended, inactive, or asleep. If the driving status app is asleep on the contact's mobile device, then the web service call causes the driving status app to wake up. For example, a VoIP protocol may be used to wake up the driving status app running in the background. For example, the server may receive a regular web service call and then generate a VoIP web service call for sending out to all friends' and family regardless of the recipients' mobile device. Alternatively, since at the present time, VoIP web service call is only relevant/necessary for Apple iPhones, the server recognize the type of mobile device/operating system the mobile device is running and then send out a regular web service call or VoIP web service call depending on the receiving device.

In step 308, it is determined whether the address book of the contact's mobile device contains a match to the driver's contact information. The contact information should be a unique identifier associated only with that contact's mobile device. For example, on a mobile phone, the unique identifier is the mobile phone number. Other unique identifiers could be a Twitter, Facebook, or Instagram handle.

If no match is made, then the program ends. Optionally, a message may be sent to the driver's mobile device indicating that the selected contact did not receive the web service call. Such message may be configured to appear when it is determined that the driver is no longer driving.

If the address book of the contact's mobile device contains a match to the driver's contact information, then in step 310, the web service call causes the native address book/contacts database on the contact's mobile device to be updated with the status of the driver.

Mobile devices have a program that uses a set of standardized requests, called application programming interfaces (API), that have been defined for the program being called upon. The API is how an application enters the mobile device and exchanges information. Almost every application depends on the APIs of the underlying operating system to perform such basic functions as accessing the file system. A program's API defines the proper way for an application (e.g. driving Status app) to request services from that program. Herein, the driving Status app can make requests by including calls in the code of their applications. The syntax is described in the documentation of the application being called. By providing a means for requesting program services, an API is said to grant access to or open an application. For example, Cocoa Touch is Apple's native object-oriented application programming interface (API) for their operating system iOs for iPhones.

Figure 9:
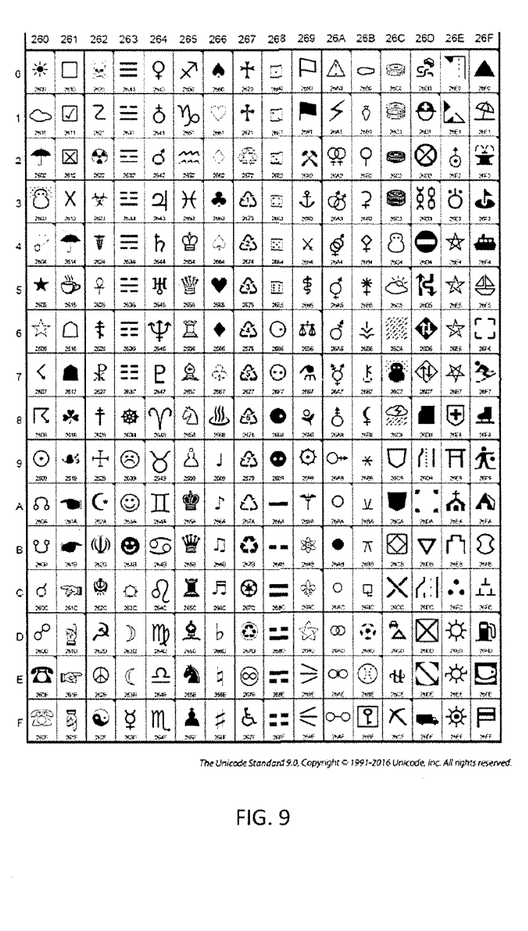
FIG. 9 depicts a selection of Unicode icons

The driving Status app updates the native address book/contacts database by inserting a code with the contact's driving status. In particular, the code may be associated with a Unicode icon such as the yellow icon with the exclamation point therein. Unicode provides a unique number for every character, no matter what the platform, no matter what the program, no matter what the language. Examples of Unicode icons and numbering codes are depicted in FIG. 9 (The Unicode Standard 9.0, Copyright 1991-2016, Inc., Range 2600-26FF). The web service call in step 310 does not otherwise update and/or change any third party applications on the contact's mobile device.

In step 312, it is determined whether there is a third party application opened for messaging. Third party apps may be any app capable of sending or receiving a message such as a text message or picture or link such as What's App, Messenger, Hangouts, and the like.

If a third party application on the contact's mobile device is opened, then, as shown in step 314, an icon associated with the Unicode appears next to the name of the person associated with driver's mobile device. Such icon may be any suitable Unicode, for example, a yellow triangle with an exclamation point.

In step 316, it is determined whether the driving status has changed. For example, the server may send an updated web service call when the driving status has changed. If the answer is affirmative, the driving status app will automatically update the status display in the contacts' mobile. In particular, the web service call will again cause the native address book/contacts database on the contact's mobile device to be updated with the status of the driver such as by removing the previously inserted Unicode. Thus, if the driver is no longer driving, when the third party application is opened, the icon will be gone.

Figure 4:
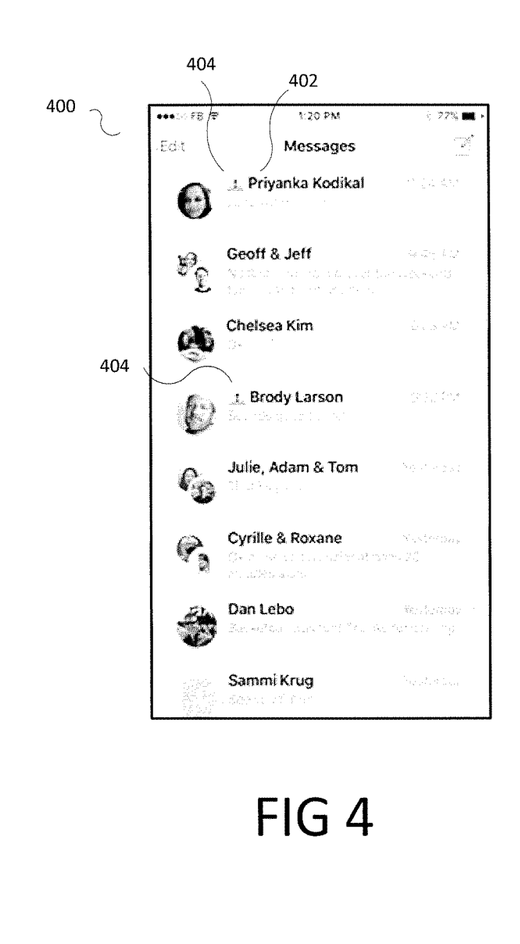
FIG. 4 is an exemplary screen shot of a contact list indicating whether a contact is driving.

FIG. 4 is an illustrative screenshot 400 from a user's smartphone with a text messaging application open and shows that the user should not text friend, "Person 1," 402 because the driving Status app has inserted a Unicode icon 404 (i.e., a yellow triangle with an exclamation point) besides Person 1's name indicating that Person 1 is driving. Likewise Person 4 should not be texted as the Unicode icon also appears next to his name.

In screenshot 400, icons are not placed next to the other listed names. If these names have the driving Status app installed and operating on their respective mobile devices, the lack of the icon may indicate they are not driving in a vehicle containing their mobile device. Otherwise, the lack of an icon next to these names in the messaging app provides no indication that the recipient is driving or not driving.

FIG. 5 is another illustrative screenshot 500 from a user's phone and shows the user that they should not text friend, "Person 1," 502 because the driving status application has outlined/circled/highlighted 504 Person 1's name indicating Person 1 is driving. In this aspect, the words "in transit" appear below the photograph.

In another example involving a group text message (e.g., MMS), the one or more people in the group 506 that are driving may have their individual photographs highlighted to signify an "in transit" status. As such, a sender of a group message can readily see that one or more recipients may be distracted by the message while driving. Notably, the addition of highlighting, "in transit", or Unicode characters near a person's contact name is unbeknownst to the third party application (e.g., group text message). Rather, the aforementioned feature works seamlessly, in many embodiments, to update in real-time a shared, native address/contacts book such that the updates are propagated to other users without requiring modification of the source code or functionality of the third-party application. The native address/contact book may be shared across a plurality of third-party applications.

Figure 6:
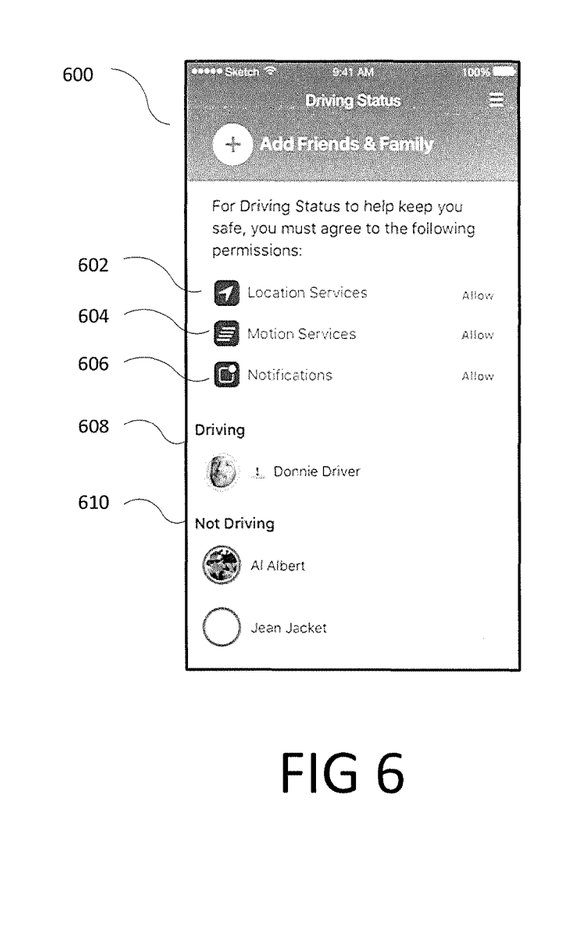
FIG. 6 is an exemplary screen shot of a driver to allow access to location, motion, and notification services.

FIG. 6 illustrates a possible screenshot 600 provided by the driving status app on the mobile device requesting permission to allow access to each of location services 602, mobile services 604, and notifications 606 in a mobile device. In this screen shot, the application provides a list of all contacts that have accepted the driving status application. The application then provides a list of such contacts under the heading "Driving" 608 or "Not Driving" 610. Unlike the messaging contact list of FIG. 4, for example, screenshot 600 depicts the contacts that have the driving status app installed and operating on their respective mobile devices. Hence a clear conclusion that a contact is or is not driving may be drawn.

Figure 7:
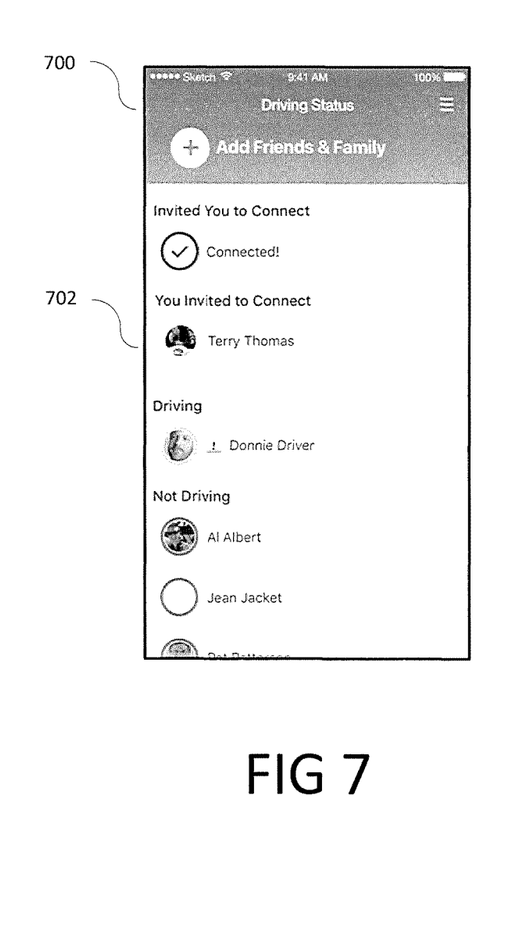
FIG. 7 is an exemplary screen shot of an invitation to connect to the driver app.

FIG. 7 illustrates a possible screenshot 700 provided by the driving status app on the mobile device inviting contact Terry Thomas 702 to connect to users friends and family. For example, a user having the driving status application installed wishes to invite Terry to install the app on his respective device (assuming he does not already have the app installed) and to accept the request to connect with the user so that driving status may be communicated between mobile devices of the user and Terry.

FIG. 8*a*-8*i* illustrates screen shots of one example embodiment after installation of the driving status application onto a smartphone. This example embodiment represents one of many possible screenshots that may be utilized for configuring the driving status app after installation on a mobile device.

Figure 8A:
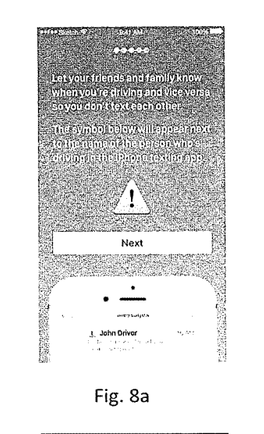
FIGS. 8a-8i are exemplary screen shots for configuring a driver app.

FIG. 8*a* illustrates an introductory screen that explains that friends and family will be able to know if you are they are driving. The screenshot explains that an icon will be placed next to the name of the person driving.

Figure 8B:
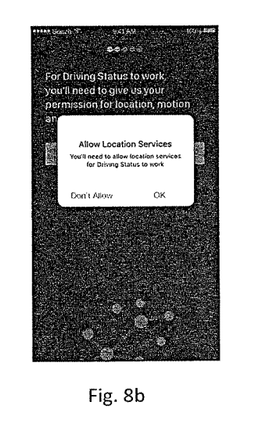
Figure 8C:
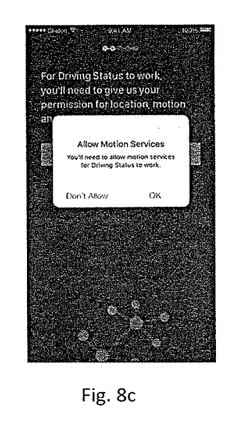
Figure 8D:
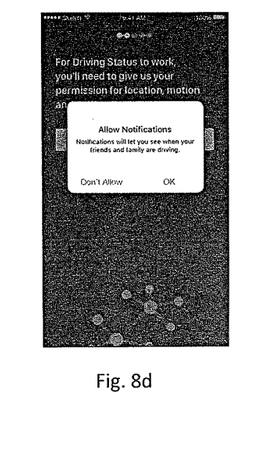
Figure 8E:
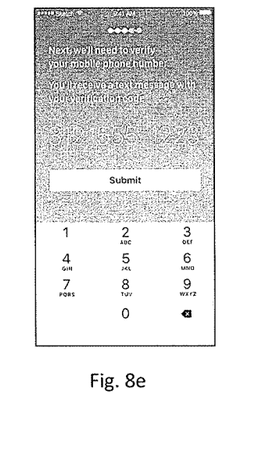
Figure 8F:
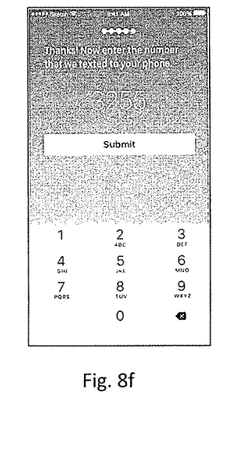

FIGS. 8*b*, 8*c*, and 8*d* illustrate screen shots to allow access to location services, motion services, and notifications, respectively. The location and motion services will allow the smartphone to determine whether the smartphone is in a vehicle that is in transit. The Notifications will allow the smartphone to send and receive notification related to driving status. FIGS. 8*e* and 8*f* illustrate example screen shots and procedures that may be used to confirm the identity of the driver associated with the mobile device phone number. The mobile number is entered and submitted as depicted in the screen shot of FIG. 8*e* and a received test number is entered and submitted as depicted in the screen shot of FIG. 8*f*.

Figure 8G:
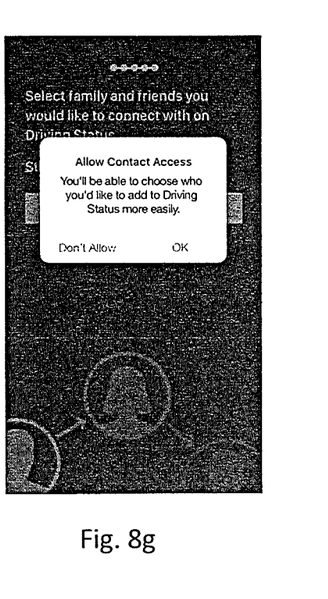
Figure 8H:
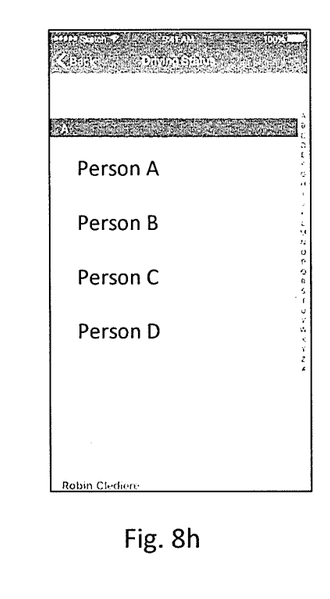
Figure 8I:
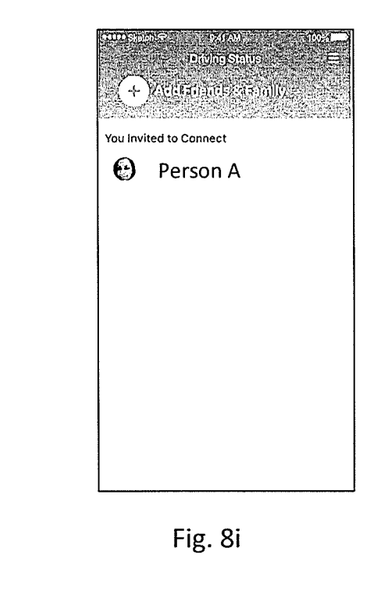

FIGS. 8*g*, 8*h*, and 8*i* relate to identifying and connecting with contacts. FIG. 8*g* depicts a screen shot where the driving Status app requests permission to access contacts so that the user may select the contacts to add to the driving status contact list. FIG. 8*h* provides a list of contacts. One of the contacts may be selected and an invitation to connect is sent to the selected contact's mobile device as seen in the screen shot of FIG. 8*i*.

In other embodiments, the present driving status application may be extended to other uses. For example, instead of driving status, the application may be used to determine if a person is riding a bicycle or is attending a show or the movies. The application may be used to notify friends and family not to text the recipient. The phone automatically detects such status (the recipient does not input the status.) For example, the motion sensors may detect and provide notification if the person is believed to be riding a bicycle. Alternatively the mobile device may be able to retrieve signals from theatres that a show or movie is playing and the user is located inside the particular seating area of that show/movie currently playing.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

What is claimed is:
1. A mobile device comprising;
a native address book stored in a memory of the mobile device; and a software application stored in the memory that, when executed by a processor of the mobile device, causes the mobile device to:
  receive a notification of the driving status of a vehicle from another mobile device;
  search the native address book for a contact associated with the another mobile device; and
  transform data records in the native address book with the driving status of the contact associated with the another mobile device by inserting an unicode character in the data records of the native address book;
  wherein the transforming of data records in the native address book transforms a third party application to display on a screen of the mobile device, the driving status alongside a contact name of the contact when the third party application is subsequently executed;
  wherein display of the driving status is unbeknownst to the third party application.

2. The mobile device as claimed in claim 1, wherein after installation of the software application onto a mobile device, the application requests permission to allow access to notification services in the mobile device.

3. The mobile device as claimed in claim 2, wherein the software application requests selection of at least one contact having a mobile device, transmits a request for permission to send notifications, and receives granted permissions for the at least one contact.

4. The mobile device as claimed in claim 3, wherein the software application automatically transmits a notification of the driving status of the mobile device if present in a vehicle to mobile devices of the contact having granted permission.

5. The mobile device as claimed in claim 1 wherein the driving status is detected using at least one of GPS, accelerometer, compass, and gyroscope.

6. The mobile device as claimed in claim 1 wherein the software application is further configured to receive a notification of a change in driving status of the vehicle from the another mobile device and transform the data records in the native address book with the change of driving status of the contact associated with the another mobile device.

7. The mobile device as claimed in claim 1 wherein the software application transforms the data records of the native address book by inserting a Unicode in code identifying the contact associated with the another mobile device.

8. The mobile device as claimed in claim 7 wherein the transformed data records in the native address book causes a third party application to display on the screen an icon associated with the Unicode.

9. The mobile device as claimed in claim 1 wherein the search of the native address book occurs by identifying the unique identifier associated with the sender's mobile device, searching the native address book for the unique identifier; and if the search locates the unique identifier, transforming the data records in the native address book by inserting a Unicode in code identifying the contact associated with the unique identifier.

10. A system comprising:
  a vehicle;
  a server computer comprising hardware including a processor and memory;
  a first mobile device positioned inside of the vehicle, the mobile device configured to automatically detect indicators of driving status of the vehicle and then transmit the indicators to a server,
  a second mobile device, wherein the second mobile device includes contact information of the first mobile device in a native address book; and
  wherein the server computer is configured to:
    based on the indicators of driving status received from the first mobile device, determine the driving status of the first mobile device;
    create a VoIP notification; and
    transmit the VoIP notification to at least the second mobile device; and
  wherein the second mobile device is configured to:
    receive the VoIP notification;
    wake up an application installed on the second mobile device that is in a suspended mode, in response to receiving the VoIP notification; and
    transform data records in the native address book with the driving status;
  and wherein the transformed data records in the native address book causes a third party application executing on the second mobile device to display the driving the status alongside the contact name when the third party application is subsequently executed, wherein display of the driving status is unbeknownst to the third party application.

11. The system as claimed in claim 10, wherein the first mobile device requests permission to allow access to notification services in the second mobile device.

12. The system as claimed in claim 10, wherein the first mobile device automatically transmits indicators of driving status to the server.

13. The system as claimed in claim 10, wherein the system detects the driving indicators using at least one of GPS, accelerometer, compass, and gyroscope.

14. The system as claimed in claim 10, wherein the data records of the native address book is transformed with a change of driving status by inserting a Unicode in code identifying the contact associated with the first mobile device.

15. The system as claimed in claim 14, wherein the transformed data records in the native address book causes a third party application to display on the screen of the second mobile device an icon associated with the Unicode.

16. The system as claimed in claim 14, wherein the server is further configured to transmit the notification to a third mobile device, wherein the third mobile device is configured to:
  transform the data records in the native address book in the third mobile device with the driving status; and
  wherein the transformed data records in the native address book in the third mobile device causes a third party application executing on the third mobile device to display the driving the status alongside the contact name when the third party application is subsequently executed.

17. The system as claimed in claim 16, wherein the data records of the native address book in the third mobile device is transformed with a change of driving status by inserting a Unicode in code identifying the contact associated with the first mobile device.

18. The system as claimed in claim 17, wherein the transformed data records in the native address book in the third mobile device causes a third party application to display on the screen of the third mobile device an icon associated with the Unicode.

19. The system as claimed in claim 10, wherein the transformed data records in the native address book is updated by identifying a unique identifier associated with the sender of the first mobile device, searching the native address book for the unique identifier; and if the search locates the unique identifier, transforming the data records in the native address book by inserting a Unicode in code identifying the contact associated with the unique identifier.

20. A method for automatically detecting a driving status of a person comprising:
   requesting permission of the person to allow access to location, motion, and notification services in a mobile device of the person;
   requesting the person to select contacts;
   requesting permission from the selected contacts to connect to an application by sending a request to a mobile device corresponding to the selected contacts;
   automatically detecting driving indicators of the person;
   automatically transmitting the driving indicators to a server to determine if the person is driving; and
   automatically notifying the driving status of the person to mobile devices of connected contacts by
   searching the native address books of the connected contacts for a contact associated with the person; and
   transforming data records in the native address books with the driving status of the contact associated with the person by inserting an unicode character in the data records of the native address books;
   wherein the transforming of data records in the native address books transform a third party application to display on a screen of the mobile devices, the driving status alongside a contact name of the contact when the third party application is subsequently executed;
   wherein display of the driving status is unbeknownst to the third party application.

* * * * *